Feb. 11, 1936.  J. B. HODTUM  2,030,370

BUSHING ASSEMBLY

Filed Sept. 17, 1931

Inventor
J. B. Hodtum
by
Attorney

Patented Feb. 11, 1936

2,030,370

UNITED STATES PATENT OFFICE 2,030,370

BUSHING ASSEMBLY

Joseph B. Hodtum, Bellevue, Pa., assignor to Allis-Chalmers Manufacturing Company, Milwaukee, Wis., a corporation of Delaware Application September 17, 1931, Serial No. 563,319

10 Claims. (Cl. 173—311)

This invention relates in general to electrical insulators and more in particular to a bushing assembly having an improved clamping member.

In the electrical arts where a conductor carrying a high voltage extends through a hole in a metallic casing or supporting member it is customary to insulate the conductor therefrom by passing the conductor through a porcelain bushing which is held in place in the hole by means of clamps. Various kinds of clamps for holding bushings in place are known; some of them depend upon a plurality of screws to hold the bushings in place, others have small loose parts which are liable to fall apart during assembly and disassembly, and most of them are so complicated that their manufacture is expensive.

It is an object of this invention to provide an improved bushing assembly which avoids the above objections.

Another object of this invention is to provide a contractible bushing clamp having the form of a frusto-conical band.

A further object of this invention is to provide a bushing assembly which is simple and rugged in construction, easily assembled, and inexpensive.

These and other objects and advantages are attained by this invention, various novel features of which will be apparent from the description and drawing herein, and will be more particularly pointed out in the claims.

An illustrative example of the application of this invention is shown in the accompanying drawing in which.

Figure 1:
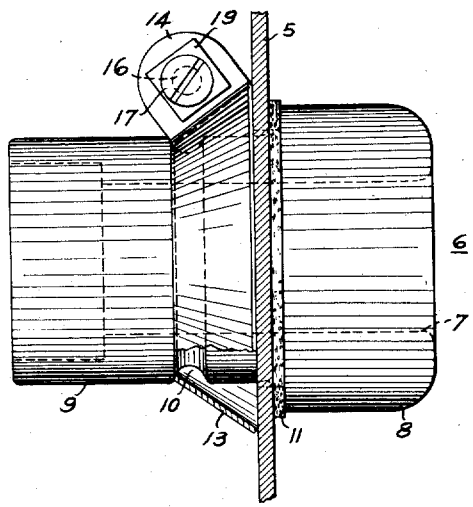
Fig. 1 is a side view of a bushing assembly with a portion of the bushing clamp shown in section.
Figure 2:
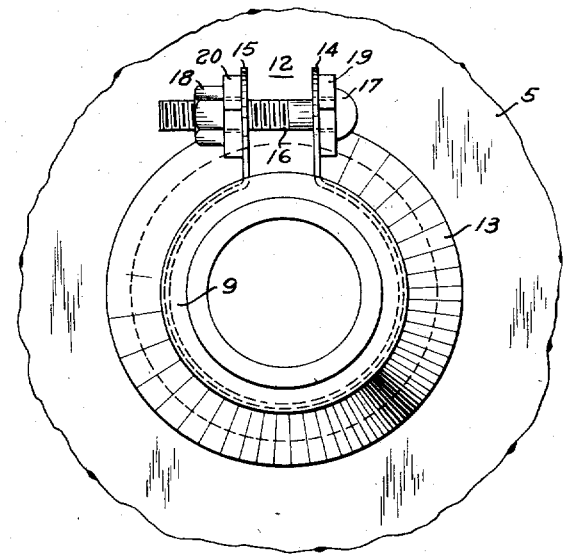
Fig. 2 is an end view of the bushing assembly shown in Fig. 1.

In the illustrated embodiment of this invention 5 is a metallic casing or supporting member having a hole therein. A porcelain bushing indicated generally by 6 projects through the hole in casing member 5 and is provided with an internal bore 7, an enlarged head member 8, and a shank portion 9 of reduced diameter. Shank portion 9 which extends through the hole in member 5 is provided with a stop means for one edge of the clamping ring which is shown in the illustrated embodiment as an annular groove 10 of semi-circular cross section located at a point adjacent the member 5. A clamping member indicated generally by 12 has a circular band portion 13 defining a frustum of a cone and has turned-up ends 14, 15 located in parallel planes and provided with holes therein adapted to receive clamping bolt 16.

The smaller part of the frustum is disposed in the groove 10 and the larger part is in engagement with supporting member 5. Interposed between the head 17 and nut 18 of bolt 16 are square washers 19 and 20 which serve as strain distributing members.

In assembling the bushing assembly the shank 9 of bushing 6 is passed through the opening in supporting member 5 with gasket member 11 interposed between head portion 8 and member 5. Clamping member 12 is then placed around shank 9 with the edge thereof having the lesser diameter lying in groove 10. Bolt 16 and washers 19, 20 are then assembled and tightened. In forcing the ear members 14 and 15 together the circumference of the larger part of the frustum will decrease consequently causing the axial width of the clamping band 13 to increase thereby forcing the head portion of bushing 6 into firm engagement with gasket 11. The slope of the groove will also assist in the clamping action of the member 12 by a wedging action and this slope may be at any suitable angle or curve which will provide a wedging action and at the same time provide a positive stop. It has been found that a clamping band sufficiently flexible to permit the above axial expansive action will be so weak that the ear portions 14 and 15 will tend to bend and for this reason square washers 19 and 20 are used. These washers serve to transfer stress to points near the surface of the frusto-conical band thereby preventing bending of the ear portions.

It is to be understood that the disclosure herein described is merely illustrative of the invention and is not to be taken in a limiting sense, changes in details of construction and arrangement of parts being permissible so long as within the spirit of the invention and the scope of the claims which follow.

It is claimed and desired to secure by Letters Patent:

1. In combination, a supporting element having a hole therein, an insulating member having an annularly grooved shank portion extending through said hole and having a head portion adjacent one side of said supporting element, a frusto-conical band having one edge in said groove and another edge engaging the opposite side of said supporting member, and means for increasing the axial width of said frusto-conical band so as to bias the head portion of said insulating member toward said supporting element.

2. The combination with a supporting element having an aperture therein and a bushing having an annularly grooved shank portion extending through said aperture, said bushing having a shoulder portion engaging one face of said supporting element, of a frusto-conical clamping band, having one circumferential edge arranged in said groove and having another circumferential edge engaging the opposite face of said supporting element, and means for decreasing the circumference of the second mentioned edge of said frusto-conical band so as to increase the altitudinal distance between the edge in said groove and the plane of the other of said edges.

3. In combination, a member having a hole therethrough, an insulating bushing having a reduced portion extending through said hole so that the non-reduced portion of said bushing engages one side of said member, said reduced portion having an annular groove therein, an expansible frusto-conical band encompassing said reduced portion and having one edge thereof arranged in said groove and another edge thereof in engagement with the opposite side of said member, and means for reducing the circumference of said band to thereby increase the axial width of said band so as to bias the non-reduced portion of said bushing toward said member.

4. In combination, a supporting member having an aperture therethrough, an insulating member having a shank portion extending through said aperture and having a head portion arranged adjacent one side of said supporting member, said shank portion having an annular groove therein, a frusto-conical clamping band extending substantially around said shank portion and having one edge in said groove and another edge in engagement with said supporting member, said band also having end portions, and means for moving said end portions toward each other so as to increase the axial width of said frusto-conical band.

5. In combination, a body having an aperture therethrough, an insulating bushing having a shank portion projecting through said aperture, said bushing also having a head portion, a gasket interposed between said head portion and one side of said body, said shank portion having an annular groove of semi-circular cross-section on the portion thereof which projects beyond said body, a frusto-conical strip having one edge arranged in said groove and another edge in engagement with the opposite side of said body, and means for biasing the ends of said strip toward each other so as to clamp said insulating bushing to said body.

6. In combination, a supporting member having an aperture therein, an insulating member arranged in said aperture and having means cooperating with said supporting member for limiting the movement of said insulating member relative to said supporting member in one direction, and means for preventing movement of said insulating member relative to said supporting member in the opposite direction comprising stop means provided with a face inclined in said opposite direction and a split frusto-conical clamping ring having one extreme circumferential edge thereof freely engaging said insulating member at said face of said stop means and the other extreme circumferential edge thereof engaging said supporting member, said movement preventing means also comprising means for reducing the circumference of each edge of said frusto-conical clamping ring.

7. The combination with a supporting element having a hole therein, of a bushing having a shank portion projecting through said hole and having a head portion, a gasket interposed between said head portion and said supporting element, said shank portion having an annular groove therein, a frusto-conical clamp having edges engaging said groove and said supporting element respectively and also having apertured ears, a bolt passing through said apertured ears for tightening said clamp, and square washers interposed between said bolt and said apertured ears.

8. In combination, a supporting member having a hole therethrough, an insulating bushing having a shank portion projecting through said hole and having a head portion arranged adjacent one side of said supporting member, said shank portion having an annular groove adjacent the opposite side of said supporting member, a split clamping ring of frusto-conical shape having an edge portion arranged in said annular groove and having another edge portion engaging the side of said supporting member opposite to said head portion, said clamping ring having outwardly bent end portions with holes therein, a clamping bolt extending through the holes in said end portions, and strain distributing washers interposed between said bolt and said end portions.

9. In combination, a supporting element having a hole therein, an insulating member having an annularly grooved shank portion extending through said hole and having a head portion adjacent one side of said supporting element, a frusto-conical band having one edge in said groove and another edge engaging the opposite side of said supporting member, and means for simultaneously contracting said one edge in said groove and springing said other edge tightly against said opposite side of said supporting member to force and hold said head portion in close relation to said one side of said supporting member.

10. In combination, a supporting member having an aperture therethrough, an insulating member having a shank portion extending through said aperture and having a head portion arranged adjacent one side of said supporting member, said shank portion having a shoulder member provided with a face inclined in a direction toward said head portion, a frusto-conical clamping band extending substantially around said shank portion and having one edge in engagement with said face of said shoulder and another edge in engagement with said supporting member, said band also having end portions, and means for moving said end portions toward each other so as to increase the axial width of said frusto-conical band.

JOSEPH B. HODTUM.